United States Patent
Hashimoto

(10) Patent No.: US 7,027,611 B2
(45) Date of Patent: Apr. 11, 2006

(54) CONTROLLING A WATERMARK STRENGTH EMBEDDED INTO A DIGITAL IMAGE

(75) Inventor: Masahiro Hashimoto, Tokyo (JP)

(73) Assignee: NEC Corporation, (JP)

( * ) Notice: Subject to any disclaimer, the term of this patent is extended or adjusted under 35 U.S.C. 154(b) by 662 days.

(21) Appl. No.: 09/876,708

(22) Filed: Jun. 7, 2001

(65) Prior Publication Data

US 2001/0053237 A1 Dec. 20, 2001

(30) Foreign Application Priority Data

Jun. 7, 2000 (JP) .............................. 2000-169927

(51) Int. Cl.
*G06K 9/00* (2006.01)
(52) U.S. Cl. ........................ 382/100; 382/250; 380/201
(58) Field of Classification Search ................ 382/250, 382/232, 248–251, 253, 100, 135, 136, 137, 382/138, 139, 140, 149, 168, 194, 212, 305, 382/169, 171, 172, 214, 233–239, 260, 274, 382/280; 380/55, 201, 217, 54; 705/45, 705/57; 375/150, 240.01; 348/14.07, 14.15
See application file for complete search history.

(56) References Cited

U.S. PATENT DOCUMENTS

| 5,915,027 | A  | * | 6/1999 | Cox et al. ..................... 380/54 |
| 6,069,914 | A  | * | 5/2000 | Cox ........................... 375/150 |
| 6,185,312 | B1 | * | 2/2001 | Nakamura et al. ........... 382/100 |
| 6,222,932 | B1 | * | 4/2001 | Rao et al. .................... 382/100 |
| 6,226,387 | B1 | * | 5/2001 | Tewfik et al. ............... 382/100 |
| 6,415,041 | B1 | * | 7/2002 | Oami et al. ................. 382/100 |
| 6,701,062 | B1 | * | 3/2004 | Talstra et al. ................. 376/94 |
| 6,704,431 | B1 | * | 3/2004 | Ogawa et al. .............. 382/100 |

* cited by examiner

*Primary Examiner*—Sanjiv Shah
*Assistant Examiner*—Seyed Azarian
(74) *Attorney, Agent, or Firm*—Dickstein, Shapiro, Morin & Oshinsky, LLP.

(57) ABSTRACT

On embedding a watermark in a stream of digital images, a watermark strength is automatically varied in accordance with an amount of the digital images by detecting the amount of the digital images by a detection portion. The amount of the digital images may be measured at every unit time, for example, a unit of block, macroblock, slice, picture. Thus, detectability of the watermark is improved by adjusting the watermark strength on the basis of the amount of the digital images.

23 Claims, 4 Drawing Sheets

CONTROLLING A WATERMARK STRENGTH EMBEDDED INTO A DIGITAL IMAGE

BACKGROUND OF THE INVENTION

This invention relates to a device and a method for inserting or embedding, into a digital image, an electronic watermark which may identify a copy right and the like.

Recently, popularization of digital satellite broadcast, internet, a DVD (digital video disc) makes it possible to easily get digital images by users. Since such digital images are not degraded in image quality even by being repeatedly copied, protection of a copy right becomes very important more and more. In order to ensure copy right protection, proposals have been made about a technique of embedding information related to a copy right and the like into DCT (discrete cosine transform) coefficients obtained from digital images.

Specifically, a conventional technique uses an electronic watermark insertion circuit that is operable in response to a sequence of digital images subjected to preprocessing. In such an electronic watermark insertion circuit, an electronic watermark is inserted or embedded into the preprocessed digital images at an invariable watermark strength once insertion of such an electronic watermark is started. In other words, the watermark strength can not be changed until insertion of the electronic watermark is stopped.

With this conventional technique, such an electronic watermark should be inserted at a weak watermark strength even when the digital images are weak in a detection ability of detecting the inserted watermark. This makes it difficult to detect the inserted electronic watermark. To the contrary, the electronic watermark is inserted at a strong watermark strength when the digital images are strong in the detection ability, which inevitably results in deterioration of the image quality.

SUMMARY OF THE INVENTION

It is an object of this invention to provide an electronic watermark insertion device which can accurately detect an electronic watermark without any deterioration of an image quality.

It is another object of this invention to provide a method of inserting an electronic watermark without depending on a detection ability of digital images.

An electronic watermark system is for use in inserting an electronic watermark into a digital image and comprises measuring means for measuring a data amount of the digital image per unit time to produce a detection signal representative of a result of measurement and control means for controlling a degree of insertion strength of the electronic watermark with reference to the data amount of the digital image per unit time.

In this event, the control means may comprise a judging portion for judging the data amount of the digital image to produce a judgement result signal. The electronic watermark system further comprises an insertion portion for inserting the electronic watermark by adjusting the decree of insertion strength of the electronic watermark in response to the judgement result signal.

The electronic watermark system has a preprocessing portion which is supplied as the digital image with a sequence of DCT coefficients. The measuring means measures and judges the data amount from the number of the DCT coefficients. Alternatively, the measuring means measures and judges the data amount from a bit rate of the bit sequence.

The digital image may be a sequence of encoded data encoded in accordance with the MPEG coding.

According to this invention a method is for use in inserting an electronic watermark into a digital image and comprises the steps of measuring a data amount of the digital image per unit time to produce a measurement result signal representative of a measurement result and controlling a degree of insertion strength of the electronic watermark in response to the measurement result signal to insert, into the digital image, the electronic watermark adjusted by the degree of insertion strength.

The controlling step comprises the steps of judging the data amount of the digital image with reference to the measurement result signal, adjusting the degree of insertion strength of the electronic watermark to produce an adjusted watermark, and inserting the adjusted watermark into the digital image.

The judging step may judge the data amount of the digital image with reference to the number of DCT coefficients generated by a preprocessing portion. Alternatively, the judging step may judge the data amount of the digital image with reference to a bit rate of a bit sequence generated by a preprocessing portion.

BRIEF DESCRIPTION OF THE PREFERRED EMBODIMENTS

Figure 1:
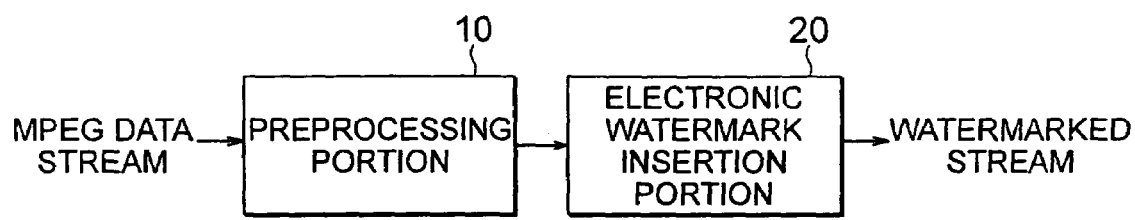
FIG. 1 shows a block diagram of a conventional electronic watermark system.

Referring to FIG. 1, description will be made about a conventional electronic watermark insertion system (will be simply called a watermark insertion system hereinafter) for a better understanding of this invention. The illustrated conventional watermark insertion system has a preprocessing portion 10 which is operable in response to a sequence or stream of image data signals subjected to the MPEG coding to preprocess the image data signal sequence into a sequence of preprocessed digital data in a known technique. The preprocessed digital data sequence is sent to an electronic watermark insertion portion 20.

Supplied with the preprocessed digital data sequence, the electronic watermark insertion portion 20 embeds an electronic watermark into the preprocessed digital data sequence to produce a watermarked data sequence or stream. In this event, the electronic watermark may be, for example, an image of a company logo or the like and may be called a watermark image hereinafter.

Such a watermark image is inserted or embedded into the preprocessed digital data sequence. Herein, it is assumed that the preprocessed digital data sequence is specified by a sequence of DCT coefficients and the watermark image is embedded into the DCT coefficients. In this event, the DCT coefficients that correspond to components of the watermark image are altered in brightness in accordance with a watermark strength. If the watermark strength is weak, the watermark image is not perceptible in inverse transform. However, if the watermark strength is strong enough, the watermark image visibly appears on a final image. Thus, there is a tradeoff between invisibility of the watermark image and its detectability or ability of detection of the watermark image.

At any rate, the watermark strength is kept constant once insertion of the watermark is started, as mentioned in the preamble of the instant specification. Therefore, the conventional system has shortcomings as described above.

Figure 2:
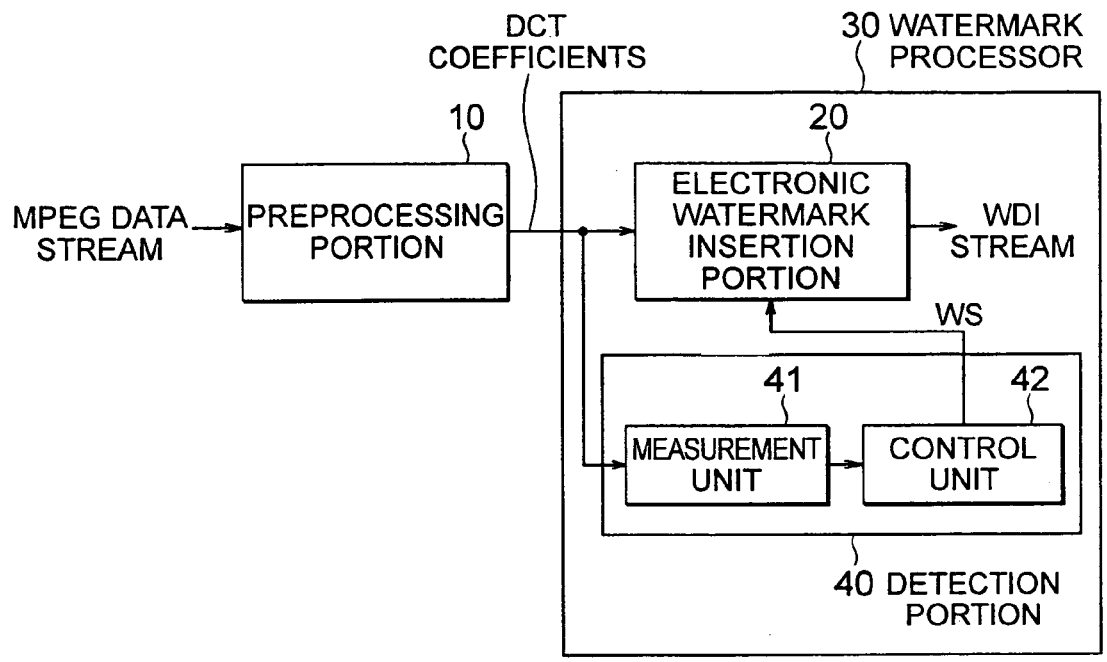
FIG. 2 shows a block diagram of an electronic watermark system according to a first embodiment of this invention.

Referring to FIG. 2, an electronic watermark system according to a first embodiment of this invention has a preprocessing portion 10 like in FIG. 1 and a watermark processor 30 which is operable in a manner to be described later. The illustrated watermark processor 30 includes an electronic watermark insertion portion 20 which is described with reference to FIG. 1.

As mentioned in conjunction with FIG. 1, the preprocessing portion 10 is supplied with a sequence of image data signals which is subjected to the MPEG coding and which may be referred to as a stream of MPEG coded data signals, namely, a MPEG data stream. The illustrated preprocessing portion 10 executes discrete cosine transform (DCT) to produce a sequence of DCT coefficients in the known manner. The DCT coefficients are representative of an image and may be called digital image signals. In any event, the DCT coefficients are delivered to the watermark processor 30.

In the illustrated example, the watermark processor 30 has a detection portion 40 supplied with the DCT coefficients, in addition to the electronic watermark insertion portion 20. The illustrated detection portion 40 has a measurement unit 41 and a control unit 42. Specifically, the measurement unit 41 is supplied with the DCT coefficients and measures a data amount per unit time to produce a detection signal representative of a result of measurement. In this example, the detection signal represents the data amount per unit time as the result of measurement and is sent to the control unit 42 of the watermark processor 30.

Supplied with the detection signal, the control unit 42 calculates a watermark strength from the data amount per unit that is measured by the measurement unit 41. The watermark strength is representative of a degree of insertion strength of the watermark that is varied between a minimum degree and a maximum degree. Thus, the control unit 42 is operable to determine the watermark strength in dependency upon the data amount per unit of the digital image signals. The watermark strength is generated by the control unit 42 as a watermark strength signal WS.

Responsive to the watermark strength signal WS and the DCT coefficients, the electronic watermark insertion portion 20 inserts the electronic watermark into the DCT coefficients with reference to the watermark strength to produce a watermarked digital image signal stream WDI. With this structure, the electronic watermark inserted in the digital image signals is adjusted in the watermark strength, depending on the data amount per unit time.

Figure 3:
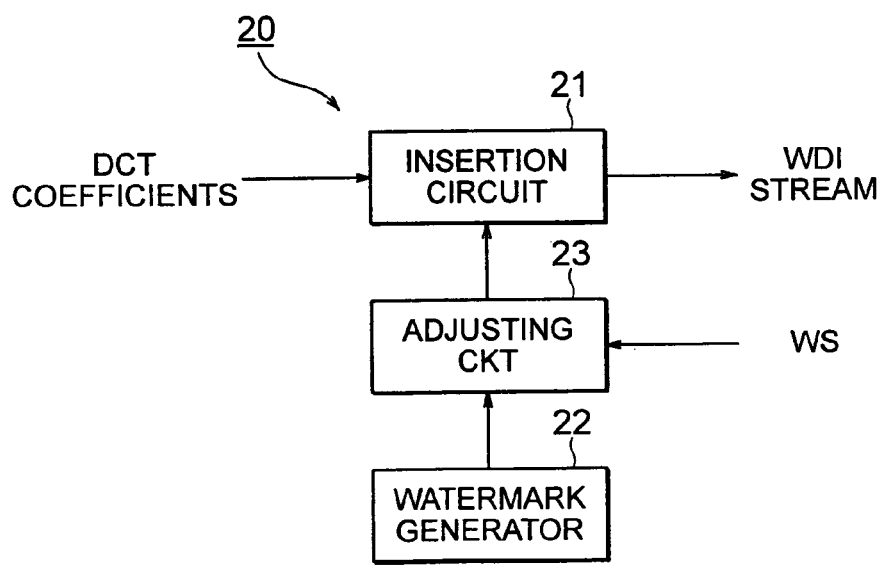
FIG. 3 shows a block diagram of a part of the electronic watermark system illustrated in FIG. 2.

Referring to FIG. 3, the electronic watermark insertion portion 20 has an insertion circuit 21, a watermark generator 22, and an adjusting circuit 23. The watermark generator 22 generates a watermark, such as a company logo, or the like, at predetermined positions or timing. The watermark is sent to the adjusting circuit 23 which is controlled by the watermark strength signal WS delivered from the control unit 42. In consequence, the watermark is controlled or adjusted in strength by the adjusting circuit 23 and is inserted into the DCT coefficients by the insertion circuit 21. Thus, the insertion circuit 21 produces the watermarked digital image signal stream WDI adjusted in the watermark strength.

Figure 4:
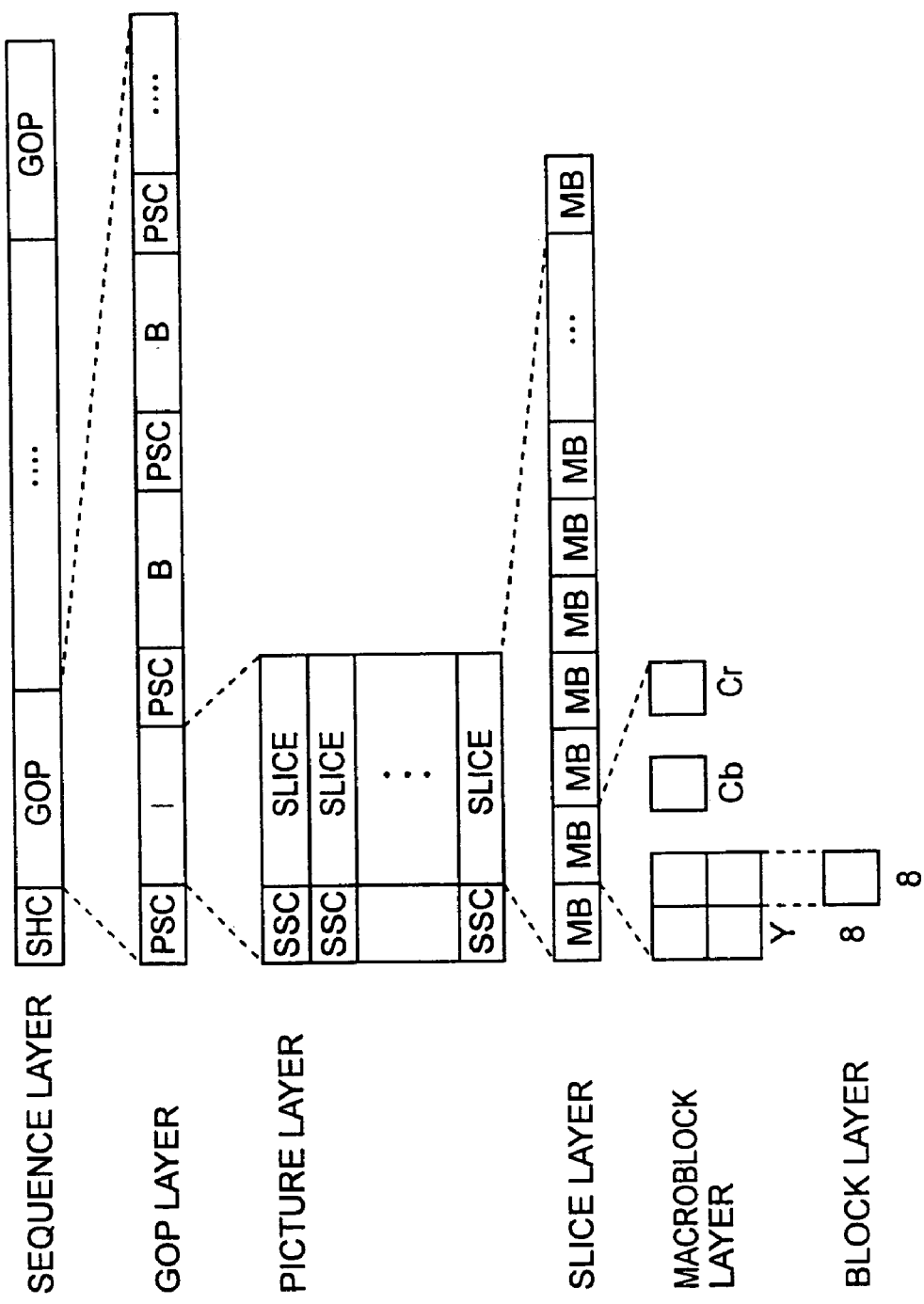
FIG. 4 shows a format for use in a code format of an image data sequence encoded in accordance with the MPEG.

Referring to FIG. 4, description will be made about a code format of the image data sequence encoded in accordance with the MPEG, so as to facilitate the instant invention. The illustrated format has a hierarchical layer structure of six layers, which is subdivided into a sequence layer, a group of picture (GOP) layer, a picture layer, a slice layer, a macroblock layer, and a block layer.

The sequence layer has a sequence header code (SHC) and a plurality of group of pictures (GOP). Each of the illustrated GOP layer has picture start codes (PSC), an I picture (intra-picture) subjected to intraframe encoding, a P picture (predictive-picture) subjected to predictive interframe encoding, and a B picture (bidirectionally-predictive-picture) subjected to bidirectional interframe encoding. Each GOP comprises a plurality of frames.

As known in the art, the above-mentioned I and P pictures are obtained by selecting, as reference image or images, any other frame image remote from a current frame image and by encoding only difference values between the current and the reference frame images. Each picture is subdivided into a plurality of blocks and is subjected to discrete cosine transform (DCT) at every block to be quantized by using an appropriate quantization factor and to be encoded, for example, into Huffman codes.

As shown in FIG. 4, each picture comprises a plurality of slices each of which follows a slice start code (SSC) and which is formed by segmenting each picture into desired areas, as shown in the picture layer of FIG. 4. As shown in the slice layer, each slice is composed of a plurality of macroblocks (MB) each of which comprises six blocks in total when a color difference format takes a format of 4:2:0. Specifically, each macroblock has four adjacent luminance component blocks Y and two color difference component blocks Cb and Cr. Furthermore, each block is composed of 8×8 pixels, as shown in FIG. 4. Thus, the illustrated hierarchical structure is formed by six layers in total.

Figures 5, 6:
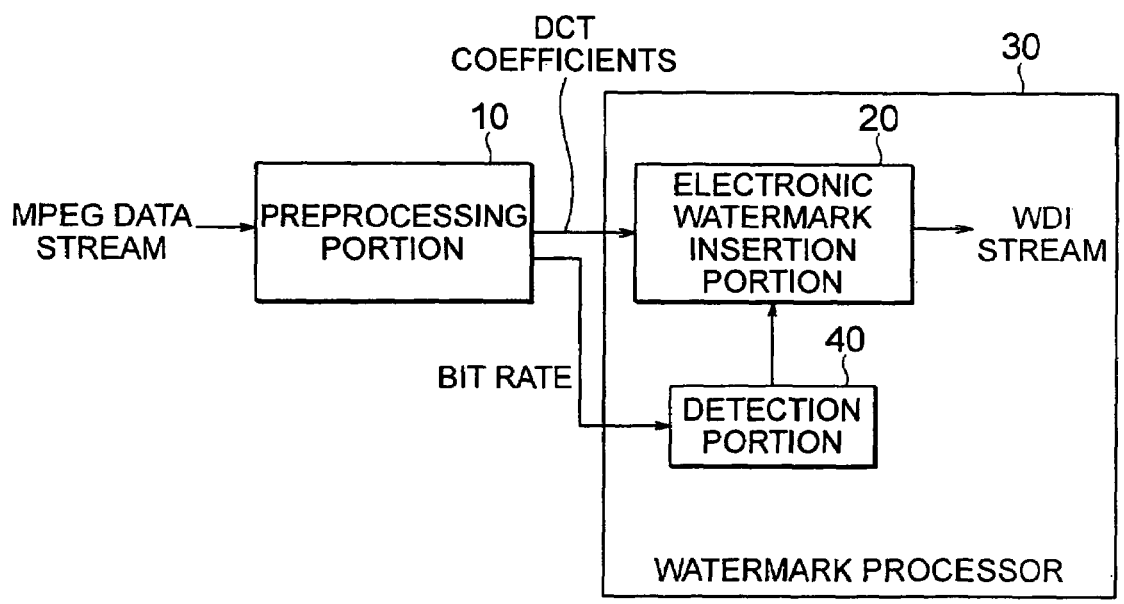
FIG. 5 shows an arrangement of DCT coefficients which are subjected to zigzag scanning.
FIG. 6 shows a block diagram of an electronic watermark system according to a second embodiment of this invention.

Referring to FIG. 5, description will be directed to variable length coding which uses the Huffman code mentioned above. In FIG. 5, first through sixty-four of the quantized DCT coefficients are numbered and are arranged on a plane determined by a horizontal spacial frequency fH and a vertical spacial frequency fV. It is assumed that the DCT coefficients quantized are scanned in a zigzag manner, as illustrated in FIG. 5. In this event, the quantized DCT coefficients are scanned in the order of the consecutive numbers from 1 to 64, as shown in FIG. 5, and are transformed into a series of sixty-four coefficients. In FIG. 5, the number "1" of the DCT coefficients represent a d.c. component in a DCT transformed area. From this fact, it is readily understood that a spacial frequency becomes high rightwards of FIG. 5 in a horizontal transformed area and downwards in a vertical transformed area. The zigzag scanning is started from the leftmost position "1" of FIG. 5 and is continued in the order of "2", "3", . . . "64". Thus, the zigzag scanning is obliquely progressive from a low frequency area towards a high frequency area on the plane illustrated in FIG. 5.

In the illustrated example, non-zero coefficient amplitudes (will be called levels) except the d.c. components (designated by the number "1") are successively combined with continuous lengths (run-length) of "0" preceding the non-zero coefficient amplitudes in connection with the series of sixty-four components. Thereafter, a quantization value is uniquely determined for each combination of the non-zero coefficient amplitudes and the run-lengths by the use of a table of quantization coefficients.

On decoding the digital image signals subjected to the MPEG coding, inverse discrete cosine transform is carried out in conjunction with a DCT coefficient obtained by multiplying a level and a quantization value by a quantization scale and is transformed into an image.

Taking the above into consideration, description will be referred back to FIG. 2. It has been readily understood that the measurement unit 41 illustrated in FIG. 2 can be measured by calculating a data amount per unit time by using the above-mentioned decoding technique while the control unit 42 can attain the watermark strength WS with reference to the calculated data amount. Thus, the detection portion 40 illustrated in FIG. 2 can automatically adjust the watermark strength WS by the use of the MPEG decoding technique.

For a better understanding of this invention, description will be made in detail about restoring or reproducing an amount of information, namely, a data amount in the detection portion 40 in response to the DCT coefficients. In FIG. 2, the preprocessing portion 10 responds to the MPEG data stream to carry out decoding and holding the data stream and thereafter classifies the same into a run-length, a level, and a DCT coefficient.

The illustrated electronic watermark insertion portion 20 is given the run-length, the level, and the DCT coefficient from the preprocessing portion 10. On the other hand, the detection portion 40, namely, the measurement unit 41 measures the data amount per unit time by successively counting the DCT coefficients at every block. Thus, the data amount is judged by the control unit 42 at every block, in the illustrated example.

On decoding the MPEG data stream, the DCT coefficients per unit block are varied from the minimum value "1" (only d.c. component) to the maximum value "64". Taking this into account, the control unit 42 judges that an amount of the watermark becomes large when the number of the DCT coefficients becomes large. Thereafter, the control unit 42 reduces an amount of the watermark inserted in the next following blocks. To the contrary, when the DCT coefficients become small in number in a current block, the control unit 42 judges that the amount of the watermark becomes small and carries out control operation such that the amount of the watermark is increased in the next following blocks.

The DCT coefficients and the amount of the watermark may be counted and judged at every macroblock, slice, picture instead of each block.

With this structure, it is possible to raise a detection strength by augment the watermark strength on detection a small amount of the watermark and to weaken the watermark strength on detection of a large amount of the watermark. This makes it possible to avoid a reduction of an image quality.

Referring to FIG. 6, an electronic watermark system according to a second embodiment of this invention has similar parts designated by like reference numerals in FIG. 2. In FIG. 6, the preprocessing portion 10 is given the MPEG data stream like in FIG. 2 and supplies the electronic watermark insertion portion 20 with the run-length and the level of the DCT coefficients. Furthermore, the illustrated preprocessing portion 10 monitors a bit rate value embedded in the MPEG data stream to produce a bit rate value.

Specifically, the illustrated preprocessing portion 10 monitors a bit rate value of 18 bits from the thirty-third bit to the fiftieth bit following the sequence header code of 32 bits in the sequence header, a bit rate extension of 12 bits from the twentieth bit to the thirty-first bit following an extension start code of 32 bits within a sequence extension, and a combination thereof.

Supplied from the preprocessing portion 10 with the bit rate value, the detection portion 40 illustrated in FIG. 6 judges that the data amount of the watermark becomes large when the bit rate value is large. On the basis of this judgement, an insertion amount of the watermark is decreased by the detection portion 40. To the contrary, an insertion amount of the watermark is increased by the detection portion 40 as a result of judging that the data amount of the watermark is reduced when the bit rate value is small.

Thus, the above-mentioned system can avoid a deterioration of the image quality by raising the watermark strength to increase the detectability of the watermark when the amount of the watermark is small and by weakening the watermark strength to avoid a reduction of the quality of image when the amount of the watermark is large.

While this invention has thus far been described in conjunction with a few embodiments thereof, it will readily be possible for those skilled in the art to put this invention into practice in various other manners. For example, this invention may not be restricted to the MPEG data sequence, if a data amount per unit time can be measured and the watermark strength can be adjusted. At any rate, the watermark strength is adjusted on inserting or embedding the watermark in the digital image. This structure is advantageous in that the detection strength of the watermark can be maintained and the reduction of the quality of image can be suppressed by adjusting the watermark strength with reference to the data amount per unit time of the watermarked data sequence.

What is claimed is:

1. An electronic watermark system for use in inserting an electronic watermark into a digital image, comprising:
   measuring means for measuring a data amount of the digital image per unit time to produce a detection signal representative of a result of measurement; and
   control means for controlling a degree of insertion strength of the electronic watermark with reference to the data amount of the digital image per unit time by increasing the degree of the insertion strength of the electronic watermark when a data amount of the electronic watermark is decreased, and by lowering the degree of the insertion strength of the electronic watermark when the data amount of the electronic watermark is increased.

2. An electronic watermark system as claimed in claim 1, wherein the control means comprises:
   a judging portion for judging the data amount of the digital image to produce a judgment result signal;
   the electronic watermark system further comprising an insertion portion for inserting the electronic watermark by adjusting the degree of insertion strength of the electronic watermark in response to the judgment result signal.

3. An electronic watermark system as claimed in claim 2, further comprising:
   a preprocessing portion which produces a sequence of DCT coefficients based on the digital image;
   the judging portion judging the data amount from the DCT coefficients.

4. An electronic watermark system as claimed in claim 2, further comprising:
   a preprocessing portion which produces a sequence of bits based on the digital image;
   the judging portion judging the data amount from a bit rate of the bit sequence.

5. An electronic watermark system as claimed in claim 1, wherein the digital image is a sequence of encoded data encoded in accordance with the MPEG coding.

6. A method of inserting an electronic watermark into a digital image, comprising the steps of:
   measuring a data amount of the digital image per unit time to produce a measurement result signal representative of a measurement result; and
   controlling a degree of insertion strength of the electronic watermark in response to the measurement result signal to insert, into the digital image, the electronic watermark by increasing the degree of the insertion strength of the electronic watermark when a data amount of the electronic watermark is decreased, and by lowering the degree of the insertion strength of the electronic watermark when the data amount of the electronic watermark is increased.

7. A method as claimed in claim 6, wherein the controlling step comprises the steps of:
   judging the data amount of the digital image with reference to the measurement result signal;
   adjusting the degree of insertion strength of the electronic watermark to produce an adjusted watermark; and
   inserting the adjusted watermark into the digital image.

8. A method as claimed in claim 7, wherein the judging step judges the data amount of the digital image with reference to the number of DCT coefficients generated by a preprocessing portion.

9. A method as claimed in claim 7, wherein the judging step judges the data amount of the digital image with reference to a bit rate of a bit sequence generated by a preprocessing portion.

10. A method as claimed in claim 7, wherein the digital image is a sequence of encoded data coded by the MPEG CODING.

11. A method of inserting an electronic watermark into a digital image, comprising the steps of:
    detecting a data amount of the digital image per unit time; and
    adjusting a degree of insertion strength of the electronic watermark on the basis of the data amount detected by increasing the degree of the insertion strength of the electronic watermark when a data amount of the electronic watermark is decreased, and by lowering the degree of the insertion strength of the electronic watermark when the data amount of the electronic watermark is increased.

12. A method as claimed in claim 11, further comprising the step of:
    preprocessing the digital image into a stream of DCT coefficients.

13. A method as claimed in claim 12, wherein the detecting step comprises the steps of:
    measuring the data amount per unit time from the DCT coefficient stream; and
    controlling the degree of insertion strength with reference to the measured data amount per unit time.

14. A method as claimed in claim 11, wherein the detecting step comprises the steps of:
    measuring a bit rate of the digital image to obtain the data amount of per unit time; and
    controlling the degree of insertion strength with reference to the measured bit rate.

15. An electronic watermark system for use in inserting an electronic watermark into a digital image, the system comprising:
    a measuring unit that measures an amount of data per a unit of time of the digital image to produce a detection signal; and
    a control unit that controls a degree of insertion strength of the electronic watermark with reference to the amount of data per a unit of time of the digital image by increasing the degree of the insertion strength of the electronic watermark when a data amount of the electronic watermark is decreased, and by lowering the degree of the insertion strength of the electronic watermark when the data amount of the electronic watermark is increased.

16. The electronic watermark system as claimed in claim 15, wherein the control unit comprises:
    a judging portion that judges the amount of data of the digital image to produce a judgment result signal; and
    the electronic watermark system further comprises an insertion portion operable to insert the electronic watermark by adjusting the degree of insertion strength of the electronic watermark in response to the judgment result signal.

17. The electronic watermark system as claimed in claim 16, further comprising:
    a preprocessing portion which produces a sequence of DCT coefficients based on the digital image;
    the judging portion judging the amount of data from the DCT coefficients to produce the judgment result signal.

18. The electronic watermark system as claimed in claim 16, further comprising:
    a preprocessing portion which produces a sequence of bits based on the digital image;
    the judging portion judging the amount of data from a bit rate of the sequence of bits.

19. The electronic watermark system as claimed in claim 15, wherein the digital image is encoded in accordance with an MPEG coding.

20. The electronic watermark system as claimed in claim 1, wherein the control means comprises:
    a detecting portion for detecting whether the data amount of the electronic watermark has increased or decreased; and
    a control portion for controlling the degree of the insertion strength of the electronic watermark by increasing the degree of the insertion strength of the electronic watermark when the data amount of the electronic watermark is detected as being decreased, and lowering the degree of the insertion strength of the electronic watermark when the data amount of the electronic watermark is detected as being increased.

21. The method as claimed in claim 6, wherein the controlling step comprises the steps of:
    detecting whether the data amount of the electronic watermark has increased or decreased; and
    controlling the degree of the insertion strength of the electronic watermark by increasing the degree of the insertion strength of the electronic watermark when the data amount of the electronic watermark is detected as being decreased, and lowering the degree of the insertion strength of the electronic watermark when the data amount of the electronic watermark is detected as being increased.

22. The method as claimed in claim 11, wherein the adjusting step comprises the steps of:
 detecting whether the data amount of the electronic watermark has increased or decreased; and
 controlling the degree of the insertion strength of the electronic watermark by increasing the degree of the insertion strength of the electronic watermark when the data amount of the electronic watermark is detected as being decreased, and lowering the degree of the insertion strength of the electronic watermark when the data amount of the electronic watermark is detected as being increased.

23. The electronic watermark system as claimed in claim 15, wherein the control unit comprises:

a detecting portion for detecting whether the data amount of the electronic watermark has increased or decreased; and
 a control portion for controlling the degree of the insertion strength of the electronic watermark by increasing the degree of the insertion strength of the electronic watermark when the data amount of the electronic watermark is detected as being decreased, and lowering the degree of the insertion strength of the electronic watermark when the data amount of the electronic watermark is detected as being increased.

\* \* \* \* \*